(12) United States Patent
Zou et al.

(10) Patent No.: US 9,706,624 B2
(45) Date of Patent: Jul. 11, 2017

(54) LIGHTING METHOD, SYSTEM, AND STREETLAMP

(71) Applicant: Leauto Intelligent Technology (BEIJING) Co. Ltd., Beijing (CN)

(72) Inventors: Yu Zou, Beijing (CN); WenRui Li, Beijing (CN); Yong Xu, Beijing (CN); KunSheng Chen, Beijing (CN); Dan Li, Beijing (CN); Wei Lin, Beijing (CN); Peng Liu, Beijing (CN)

(73) Assignee: LEAUTO INTELLIGENT TECHNOLOGY (BEIJING) CO. LTD., Beijing (CN)

( * ) Notice: Subject to any disclaimer, the term of this patent is extended or adjusted under 35 U.S.C. 154(b) by 0 days.

(21) Appl. No.: 14/979,010

(22) Filed: Dec. 22, 2015

(65) Prior Publication Data

US 2017/0118821 A1    Apr. 27, 2017

(30) Foreign Application Priority Data

Oct. 21, 2015   (CN) .......................... 2015 1 0689815

(51) Int. Cl.
*H05B 37/02*   (2006.01)
*F21S 8/08*    (2006.01)

(52) U.S. Cl.
CPC .......... *H05B 37/0227* (2013.01); *F21S 8/086* (2013.01); *H05B 37/0218* (2013.01); *H05B 37/0272* (2013.01)

(58) Field of Classification Search
CPC   H05B 37/02; H05B 37/0227; H05B 37/0218; H05B 37/0272; H05B 37/0254; H05B 33/0893; H05B 33/0854; F21S 8/10; F21S 8/086
See application file for complete search history.

(56) References Cited

U.S. PATENT DOCUMENTS

2014/0320025 A1*  10/2014  Assoulin ............ H05B 37/0227
                                                          315/154
2015/0023668 A1*  1/2015   Spaulding ........... H04B 10/1129
                                                          398/106

* cited by examiner

*Primary Examiner* — Thai Pham
(74) *Attorney, Agent, or Firm* — Hauptman Ham, LLP

(57) ABSTRACT

The present disclosure provides a lighting method, system, and streetlamp. The present disclosure may enable the streetlamp to illuminate according to the location of the vehicles, so as to avoid the wasting of electrical energy due to activation of the streetlamp during no passing of vehicles for a long time, by transmitting travelling information for indicating longitude and latitude of an adjacent vehicle by the vehicle, and providing illuminating for the roads upon determining that the vehicle is in the illumination coverage of the streetlamp by the processor in the streetlamp.

8 Claims, 3 Drawing Sheets

LIGHTING METHOD, SYSTEM, AND STREETLAMP

CROSS-REFERENCE TO RELATED APPLICATIONS

This application is based on and claims priority to Chinese Patent Application No. 201510689815.X, with the title of "LIGHTING METHOD, SYSTEM, AND STREETLAMP", filed on Oct. 21, 2015, the full disclosure of which is hereby incorporated by reference in its entirety.

TECHNICAL FIELD

The present disclosure is related to vehicle engineering, more particularly, related to a lighting method, system, and streetlamp.

BACKGROUND

Lighting is a main usage for consuming electrical energy. The modern technology has been dedicated to energy-saving in lighting technology. Although solar-cell is used dominating the energy-saving methods by now, the automatic control of lighting plays a certain role in energy saving.

In the related art, the method of controlling streetlamp includes sound-control switch, light-control switch, time relay switch, or the like. The above automatic control methods take the place of labor for switching streetlamps, and thus are the common control methods for controlling the streetlamp. However, before dawn, on most roads, particularly on the highways, there are few vehicles passing, and even on the roads in remote areas, there is no vehicles passing for long time, which causes a problem of wasting too much electrical energy due to the lighting of streetlamp.

SUMMARY

The embodiments of the present disclosure provide a lighting method, system, and streetlamp, which may solve the technical problem that the electrical energy consumed by streetlamps is too high.

To achieve the above technical objects, the embodiments of the present disclosure provide the following technical solutions.

In the first aspect, the embodiment of the present disclosure provides a streetlamp including: a communication module, a processor, a memory, and a lighting module; the communication module, the memory, and the lighting module are electrically connected with the processor, respectively. The communication module is configured to receive travelling information for indicating longitude and latitude of a vehicle. The memory is configured to store illumination coverage of the streetlamp. The processor is configured to trigger the activation of the lighting module, if the longitude and latitude received by the communication module are in the illumination coverage stored by the memory; otherwise, trigger the lighting module to be turned off. The lighting module is configured to provide illumination for roads.

According to one embodiment, the streetlamp further includes: a locating module, the locating module is electrically connected with the processor, the locating module is configured to acquire longitude and latitude data of the location where the streetlamp is located, the processor is configured to calculate the illumination coverage based on the longitude and latitude data of the location where the streetlamp is located and an illumination radius of the streetlamp.

According to one embodiment, the streetlamp further includes: an illumination sensor and a sleeping power supply circuit; the illumination sensor and the sleeping power supply circuit are electrically connected with the processor, respectively. The illumination sensor is configured to measure the illumination of current roads. The sleeping power supply circuit is configured to supply power to the locating module and the communication module according to sleeping mode and normal working mode. The processor is further configured to trigger the sleeping power supply circuit to supply power in sleeping mode, otherwise trigger the sleeping power supply circuit to supply power in normal working mode.

According to one embodiment, the locating module includes a GPS chip.

According to one embodiment, the lighting module includes a light source, a power supply and a relay, the light resource and the power supply are electrically connected with the relay, the relay is configured to maintain the electrical connections for the power supply and the light source, when the processor triggers the activation of the lighting module; and disconnects the electrical connections for the light source and the power supply, if the processor triggers the lighting module to be turned off.

According to one embodiment, the communication module includes a V2X communication chip.

In the second aspect, the embodiment of the present disclosure provides a lighting system including the streetlamp as described above and a vehicle; the vehicles configured to transmit travelling information for indicating longitude and latitude of a vehicle to the streetlamp.

In the third aspect, the embodiment of the present disclosure provides a lighting method including the steps of: receiving travelling information for indicating longitude and latitude of a vehicle; turning on the streetlamp, if the longitude and latitude are in illumination coverage of the streetlamp; otherwise, turning off the streetlamp.

The embodiment of the present disclosure may enable the streetlamp to illuminate according to the location of the vehicles, so as to avoid the wasting of electrical energy due to activation of the streetlamp during no passing of vehicles for a long time, by transmitting travelling information for indicating longitude and latitude of an adjacent vehicle by the vehicle, and providing illuminating for the roads upon determining that the vehicle is in the illumination coverage of the streetlamp by the processor in the streetlamp.

DESCRIPTION OF THE EMBODIMENTS

In the following, description will be given in detail on the lighting method, system, and streetlamp provided by the embodiments of the present disclosure, in connection with the accompanying drawing.

First Embodiment

Figure 1:
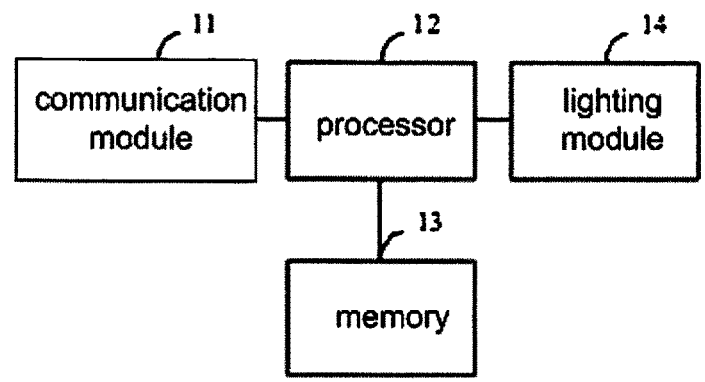
FIG. 1 is a structural view of a streetlamp provided by the first embodiment of the present disclosure.

FIG. 1 is a structural view of a streetlamp provided by the first embodiment of the present disclosure. As shown in FIG. 1, the streetlamp includes: a communication module 11, a processor 12, a memory 13, and a lighting module 14.

More particularly, the communication module 11, the memory 13, and the lighting module 14 are electrically connected with the processor 12.

The communication module 11 is configured to receive travelling information indicating the longitude and latitude of a vehicle.

More particularly, the travelling information may include the longitude and latitude of the vehicle as well as the speed and/or heading direction.

More particularly, the communication module 11 may include a V2X communication chip, for example, an NXP type of wireless chip, so as to implement communications among vehicles based on WAVE (WirelessAccessinVehicularEnvironments) protocol. The travelling information received by the communication module 11 may be the travelling information carried in the wireless short message transmitted by the vehicle using basic short message set of SAE-J2735 protocol. In a specific implementation, the communication module 11 may use i.MX6Q type of chip.

The memory 13 is configured to store the illumination coverage.

More particularly, the illumination coverage may be in a form of longitude range and latitude range, and may be in a form of illumination radius and longitude and latitude of the center illuminating point.

The processor 12 is configured to trigger the activation of the lighting module 14, if the longitude and latitude received by the communication module 11 are in the illumination coverage stored in memory 13; otherwise, trigger the lighting module 14 to be turned off.

More particularly, if the illumination coverage stored in memory 13 is longitude range and latitude range, the processor 12 may trigger the activation of the lighting module 14, if determining the received longitude and latitude of the vehicle are in the longitude range and the latitude range, otherwise trigger the lighting module 14 to be turned off.

The lighting module 14 is configured to provide illumination for the roads.

More particularly, the lighting module 14 may be a LED light source so as to further save the electrical energy required for illuminating. Also, since the LED light source takes less time for starting compared with the light source of a sodium lamp, it is possible to avoid the case that the lighting of the streetlamp may not realize the preset illumination when the vehicle travels into the illumination coverage.

The embodiment of the present disclosure may enable the streetlamp to illuminate according to the location of the vehicles, so as to avoid the wasting of electrical energy due to activation of the streetlamp during no passing of vehicles for a long time, by transmitting travelling information for indicating longitude and latitude of an adjacent vehicle by the vehicle, and providing illuminating for the roads upon determining that the vehicle is in the illumination coverage of the streetlamp by the processor in the streetlamp.

Second Embodiment

Figure 2:
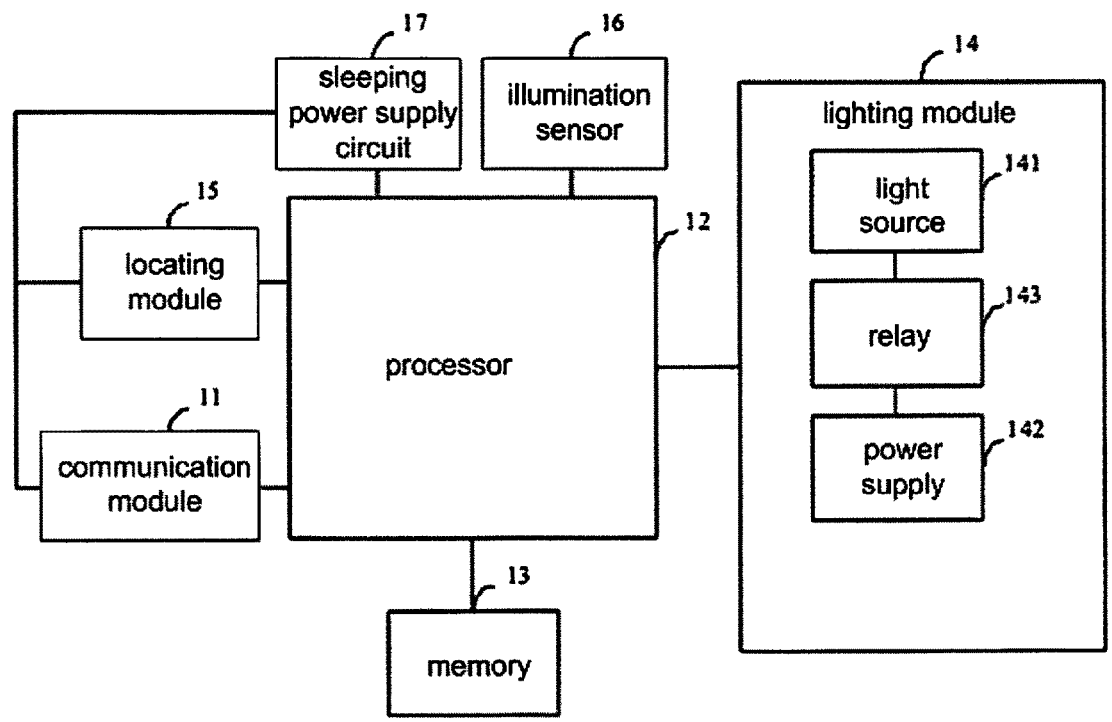
FIG. 2 is a structural view of another streetlamp provided by the second embodiment of the present disclosure.

FIG. 2 is a structural view of another streetlamp provided by the second embodiment of the present disclosure. As shown in FIG. 2, based on the previous embodiment, in the present embodiment, the streetlamp further includes a locating module 15 configured to be electrically connected with the processor 12.

The locating module 15 is configured to acquire the longitude and latitude data for indicating the location where the streetlamp is located.

More particularly, the locating module 15 may include a GPS chip, and thereby the locating module 15 may acquire the current location of the streetlamp by GPS. In a particular implementation, the GPS chip in the locating module 15 may be implemented by a BeiDou Star locating chip.

Furthermore, the streetlamp may further include: an illumination sensor 16 and a sleeping power supply circuit 17. The illumination sensor 16 and the sleeping power supply circuit 17 are electrically connected with the processor 12, respectively.

The illumination sensor 16 is configured to measure the current illumination.

The sleeping power supply circuit 17 is configured to supply power to the locating module 15 and the communication module 11 in sleeping mode and normal working mode.

The processor 12 is also configured to trigger the sleeping power supply circuit 17 to supply power in sleeping mode, when the illumination measured by the illumination sensor 16 is lower than a preset threshold.

The streetlamp may recognize that whether or not it is the case of night or low visibility, which requires lighting according to a parameter, i.e., the current illumination, acquired by the illumination sensor 16. If the illumination acquired by the illumination sensor 16 is lower than a preset threshold, it is recognized that the visibility is low or it is night, and then the processor 12 may trigger the sleeping power supply circuit 17 to supply power in normal working mode. If the illumination acquired by the illumination sensor 16 is not lower than a preset threshold, it is recognized that the visibility is not low or it is daytime, and then the processor 12 may trigger the sleeping power supply circuit 17 to supply power in sleeping mode, so that the locating module 15 and the communication 11 may enter a sleeping state.

Furthermore, the lighting module 14 may include: a light source 141, a power supply 142, and a relay 143. The light source 141 and the power supply 142 are electrically connected with the relay 143, respectively.

The relay 143 is configured to maintain the electrical connections forth light source 141 and the power supply 142, when the processor 12 triggers the activation of the lighting module 14, and disconnect the electrical connections for the light source 141 and the power supply 142, when the processor 12 triggers the deactivation of the lighting module 14.

The embodiment of the present disclosure may enable the streetlamp to illuminate according to the location of the vehicles, so as to avoid the wasting of electrical energy due to activation of the streetlamp during no passing of vehicles for a long time, by transmitting travelling information for indicating longitude and latitude of an adjacent vehicle by the vehicle, and providing illuminating for the roads upon determining that the vehicle is in the illumination coverage of the streetlamp by the processor in the streetlamp. Furthermore, it is possible to further achieve lighting according to needs, avoid wasting of electrical energy, and meanwhile omitting the procedure for manually controlling the streetlamp to be turned on and off, so as to reduce the labor cost by measuring the current illumination of the road, and activating the lighting of the streetlamp only when the current illumination of the road is lower than a preset threshold, otherwise keeping the streetlamp in sleeping mode to reduce the consumption of electrical energy.

Third Embodiment

Figure 3:
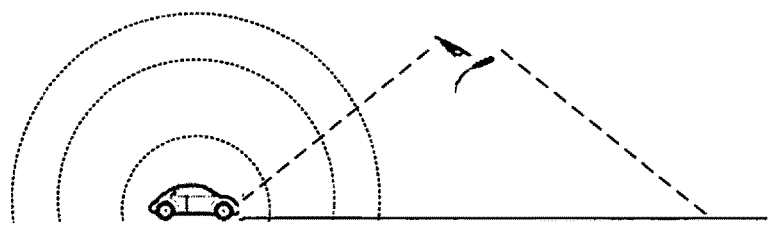
FIG. 3 is a schematic view of a lighting system provided by the third embodiment of the present disclosure.

FIG. 3 is a schematic view of a lighting system provided by the third embodiment of the present disclosure. As shown in FIG. 3, the lighting system includes the streetlamp as described in the first or second embodiment, and a vehicle.

The vehicle is configured to transmit travelling information including longitude and latitude of the vehicle.

The streetlamp is configured to receive travelling information indicating longitude and latitude of the vehicle. When the longitude and latitude are in the illumination coverage of the streetlamp, the streetlamp may be turned on; otherwise, the streetlamp may be turn off.

Furthermore, the streetlamp is further configured to acquire longitude and latitude data for indicating the location of the streetlamp. The illumination coverage may be calculated based on illumination radius of the streetlamp and the longitude and latitude data of the location of the streetlamp.

Furthermore, the streetlamp is further configured to determine that the illumination of the current road is lower than a preset threshold, before receiving the longitude and latitude data of the vehicle.

The embodiment of the present disclosure may enable the streetlamp to illuminate according to the location of the vehicles, so as to avoid the wasting of electrical energy due to activation of the streetlamp during no passing of vehicles for a long time, by transmitting travelling information for indicating longitude and latitude of an adjacent vehicle by the vehicle, and providing illuminating for the roads upon determining that the vehicle is in the illumination coverage of the streetlamp by the processor in the streetlamp. Furthermore, it is possible to further achieve lighting according to needs, avoid wasting of electrical energy, and meanwhile omitting the procedure for manually controlling the streetlamp to be turned on and off, so as to reduce the labor cost by measuring the current illumination of the road, and activating the lighting of the streetlamp only when the current illumination of the road is lower than a preset threshold, otherwise keeping the streetlamp in sleeping mode to reduce the consumption of electrical energy.

Fourth Embodiment

Figure 4:
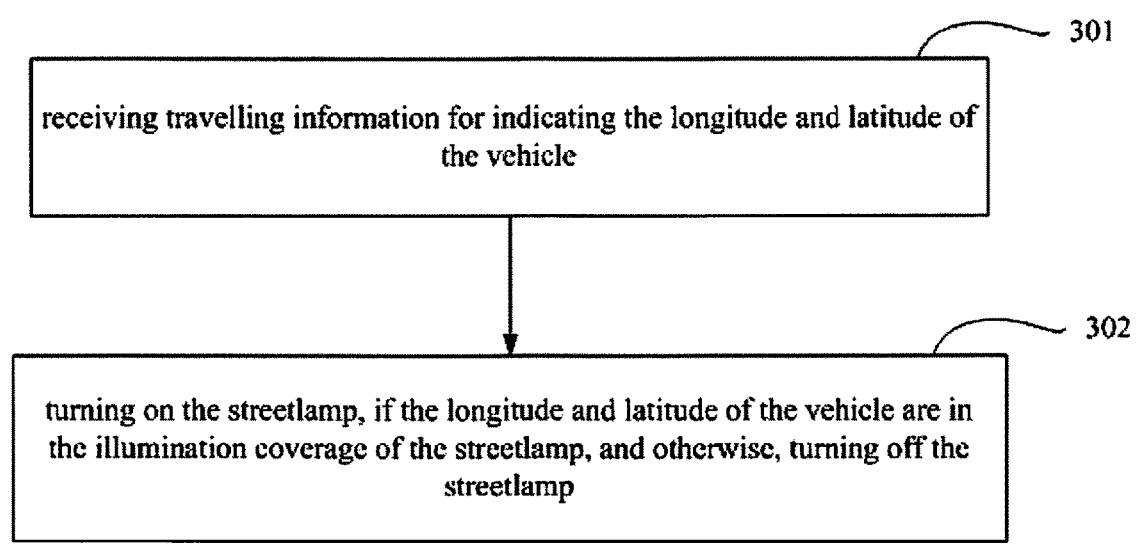
FIG. 4 is a flowchart of a lighting method provided by the fourth embodiment of the present disclosure.

FIG. 4 is a flowchart of a lighting method provided by the fourth embodiment of the present disclosure. As shown in FIG. 4, the lighting method may include:

Step 301, receiving travelling information for indicating the longitude and latitude of the vehicle.

More particularly, the travelling information may include the longitude and latitude of the vehicle as well as the speed and/or heading direction.

More particularly, the communication module 11 in the streetlamp may be configured to implement communications with vehicles based on WAVE protocol. When a vehicle comes into the communication range of the communication module (generally, 300 m to 1000 m), the communication module of the streetlamp may form a network with the vehicle automatically, and after the success of the networking, the streetlamp receives a message transmitted by the vehicle periodically (generally, with an interval of 50 ms). The travelling information received by the communication module may be the travelling information carried in the wireless short message transmitted by the vehicle using basic short message set of SAE-J2735 protocol.

Step 302, turning on the streetlamp, if the longitude and latitude of the vehicle are in the illumination coverage of the streetlamp, and otherwise, turning off the streetlamp.

More particularly, the illumination coverage may be in a form of longitude range and latitude range, and may be in a form of illumination radius and longitude and latitude of the center illuminating point. When the longitude and latitude received by the communication module are in the illumination coverage stored in a memory, the lighting module may be activated, and otherwise the lighting module may be deactivated.

Furthermore, before the step 302, the method may further include: acquiring longitude and latitude data of the location where the streetlamp is located; and calculating the illumination coverage based on the longitude and latitude data of the location where the streetlamp is located and an illumination radius of the streetlamp.

More particularly, the locating module may include a GPS chip, thereby the location module may acquire the current location of the streetlamp, calculate the illumination coverage based on the longitude and latitude data of the location where the streetlamp is located and an illumination radius of the streetlamp.

The embodiment of the present disclosure may enable the streetlamp to illuminate according to the location of the vehicles, so as to avoid the wasting of electrical energy due to activation of the streetlamp during no passing of vehicles for a long time, by transmitting travelling information for indicating longitude and latitude of an adjacent vehicle by the vehicle, and providing illuminating for the roads upon determining that the vehicle is in the illumination coverage of the streetlamp by the processor in the streetlamp.

Fifth Embodiment

Figure 5:
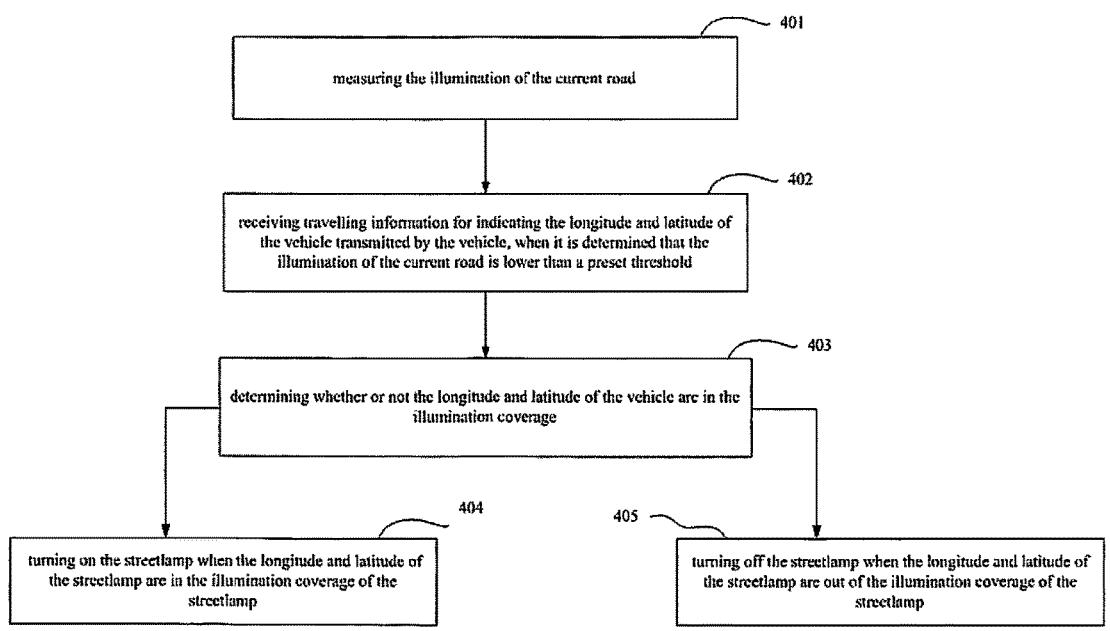
FIG. 5 is a flowchart of another lighting method provided by the fifth embodiment of the present disclosure.

FIG. 5 is a flowchart of another lighting method provided by the fifth embodiment of the present disclosure. As shown in FIG. 5, the lighting method includes:

Step 401, measuring the illumination of the current road.

More particularly, the streetlamp may include an illumination sensor, and thereby, the streetlamp may recognize that whether or not it is the case of night or low visibility, which requires lighting according to a parameter, i.e., the current illumination, acquired by the illumination sensor. If the illumination acquired by the illumination sensor 16 is lower than a preset threshold, it is recognized that the visibility is low or it is night, and then the processor may trigger the sleeping power supply circuit to supply power in normal working mode. If the illumination acquired by the illumination sensor is not lower than a preset threshold, it is recognized that the visibility is not low or it is daytime, and then the processor may trigger the sleeping power supply circuit to supply power in sleeping mode, so that the locating module and the communication may enter a sleeping state.

Step 402, receiving travelling information for indicating the longitude and latitude of the vehicle transmitted by the vehicle, when it is determined that the illumination of the current road is lower than a preset threshold.

More particularly, when it is determined that the illumination of the current road is lower than a preset threshold, the locating module and the communication module enter normal working mode. FIG. 5 is a schematic view showing that a vehicle comes into a communication range of the streetlamp. As shown in FIG. 5, when the vehicle comes into a communication range of the communication module, the communication module of the streetlamp forms a network with the vehicle automatically. After the success of the networking, the streetlamp receives a message transmitted by the vehicle periodically, and the message may include travelling information for indicating the longitude and latitude of the vehicle.

Step 403, determining whether or not the longitude and latitude of the vehicle are in the illumination coverage.

More particularly, the illumination coverage may be calculated based on the illumination radius and the longitude and latitude data of the streetlamp acquired by the locating module, and it may be determined whether or not the longitude and latitude of the vehicle are in the illumination coverage of the streetlamp.

Step 404, turning on the streetlamp when the longitude and latitude of the streetlamp are in the illumination coverage of the streetlamp.

More particularly, when the longitude and latitude of the streetlamp are in the illumination coverage of the streetlamp, the electrical connection to the light source and the power supply may be maintained, thereby the streetlamp may be turned on.

Step 405, turning off the streetlamp when the longitude and latitude of the streetlamp are out of the illumination coverage of the streetlamp.

More particularly, when the longitude and latitude of the streetlamp are out of the illumination coverage of the streetlamp, the electrical connection to the light source and the power supply may be disconnected, thereby the streetlamp may be turned off.

The embodiment of the present disclosure may enable the streetlamp to illuminate according to the location of the vehicles, so as to avoid the wasting of electrical energy due to activation of the streetlamp during no passing of vehicles for a long time, by transmitting a travelling information for indicating longitude and latitude of an adjacent vehicle by the vehicle, and providing illuminating for the roads upon determining that the vehicle is in the illumination coverage of the streetlamp by the processor in the streetlamp. Furthermore, it is possible to further achieve lighting according to needs, avoid wasting of electrical energy, and meanwhile omitting the procedure for manually controlling the streetlamp to be turned on and off, so as to reduce the labor cost by measuring the current illumination of the road, and activating the lighting of the streetlamp only when the current illumination of the road is lower than a preset threshold, otherwise keeping the streetlamp in sleeping mode to reduce the consumption of electrical energy.

One skilled in the art would appreciate that all or a part of the steps for implementing the foregoing method embodiments may be implemented by hardware related to program instructions. Foregoing programs may be stored in computer-readable storage medium, and upon being executed, such programs may perform the steps including foregoing method embodiments; and examples of foregoing storage medium include ROM, RAM, CD-ROM, a magnetic tape, other types of storage mediums which may store the program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

What is claimed is:

1. A streetlamp comprising: a communication module, a processor, a memory, a locating module, an illumination sensor and a sleeping power supply circuit and a lighting module, the communication module, the memory, the locating module, the illumination sensor, the sleeping power supply circuit and the lighting module being electrically connected with the processor respectively,
wherein the communication module is configured to receive travelling information for indicating longitude and latitude of a vehicle,
the memory is configured to store illumination coverage of the streetlamp,
the locating module is configured to acquire longitude and latitude data of a location where the streetlamp is located,
the illumination sensor is configured to measure an illumination of a current road,
the sleeping power supply circuit is configured to supply power to the locating module and the communication module according to a sleeping mode and a normal working mode,
the processor is configured to
trigger an activation of the lighting module, when the longitude and latitude of the vehicle received by the communication module are in the illumination coverage stored by the memory, and otherwise, turn off the lighting module,
calculate the illumination coverage based on the longitude and latitude data of the location where the streetlamp is located and an illumination radius of the streetlamp, and
trigger the sleeping power supply circuit to supply power in the sleeping mode when the illumination measured by the illumination sensor is lower than a preset threshold, and otherwise trigger the sleeping power supply circuit to supply power in the normal working mode,
the lighting module is configured to provide illumination for roads.

2. The streetlamp according to claim 1, wherein the locating module comprises a GPS chip.

3. The streetlamp according to claim 1, wherein the lighting module comprises a light source, a power supply and a relay, the light resource and the power supply are electrically connected with the relay, and
the relay is configured to maintain the electrical connection for the power supply and the light source when the processor triggers the activation of the lighting module, and disconnect the electrical connection for the light source and the power supply when the processor triggers the lighting module to be turned off.

4. The streetlamp according to claim 1, wherein the communication module comprises a V2X (Vehicle to X) communication chip.

5. A lighting system comprising the streetlamp according to claim 1 and a vehicle, and
the vehicle is configured to transmit travelling information for indicating longitude and latitude of the vehicle to the streetlamp.

6. A lighting method comprising:
supplying power to a locating module and a communication module in a sleeping mode when illumination of a current road is lower than a preset threshold, and otherwise supplying power to the locating module and the communication module in a normal working mode,
receiving travelling information for indicating longitude and latitude of a vehicle,
acquiring longitude and latitude data of a location where the streetlamp is located, calculating an illumination coverage based on the longitude and latitude data of the location where the streetlamp is located and an illumination radius of the streetlamp, turning on the streetlamp when the longitude and latitude of the vehicle are in the illumination coverage of the streetlamp, and otherwise, turning off the streetlamp.

7. The lighting method according to claim 6, wherein the travelling information further comprises speed or heading direction.

8. The lighting method according to claim 6, wherein the travelling information further comprises speed and heading direction.

* * * * *